(12) United States Patent
Franke et al.

(10) Patent No.: US 8,826,735 B2
(45) Date of Patent: Sep. 9, 2014

(54) DEVICE FOR RESONANTLY DRIVING A MICROMECHANICAL SYSTEM

(75) Inventors: Axel Franke, Ditzingen (DE); Frank Freund, Stuttgart (DE); Daniel Christoph Meisel, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 13/259,976

(22) PCT Filed: Jan. 28, 2010

(86) PCT No.: PCT/EP2010/051008
§ 371 (c)(1),
(2), (4) Date: Dec. 19, 2011

(87) PCT Pub. No.: WO2010/108712
PCT Pub. Date: Sep. 30, 2010

(65) Prior Publication Data
US 2012/0104978 A1    May 3, 2012

(30) Foreign Application Priority Data

Mar. 25, 2009  (DE) .......................... 10 2009 001 856

(51) Int. Cl.
  *G01C 19/56*  (2012.01)
(52) U.S. Cl.
  USPC ...................................... 73/504.12

(58) Field of Classification Search
  USPC .......................... 73/504.12, 504.14; 331/154
  See application file for complete search history.

(56) References Cited

U.S. PATENT DOCUMENTS 5,756,895 A * 5/1998 Kubena et al. ............. 73/504.12
6,204,544 B1   3/2001 Wang et al.

FOREIGN PATENT DOCUMENTS

| CN | 1488066 | 4/2004 |
|---|---|---|
| DE | 195 23 895 | 1/1997 |
| DE | 100 29 501 | 10/2001 |
| DE | 10 2006 04025 | 3/2008 |
| WO | 00/25170 | 5/2000 |

* cited by examiner

*Primary Examiner* — John Chapman, Jr.
(74) *Attorney, Agent, or Firm* — Kenyon & Kenyon LLP

(57) ABSTRACT

A device is provided for resonantly driving a micromechanical system, which includes at least one seismic mass supported by spring vibrations, at least one drive for driving the vibration of the seismic mass and at least one element that is motionally coupled to the seismic mass. Furthermore, the device includes at least one detection element for detecting a relational parameter, that changes with the vibration of the seismic mass, between the motionally coupled element and the detection element, the detection element being equipped to cause an interruption of the vibration drive when a predetermined value of the relational parameter is reached.

10 Claims, 1 Drawing Sheet

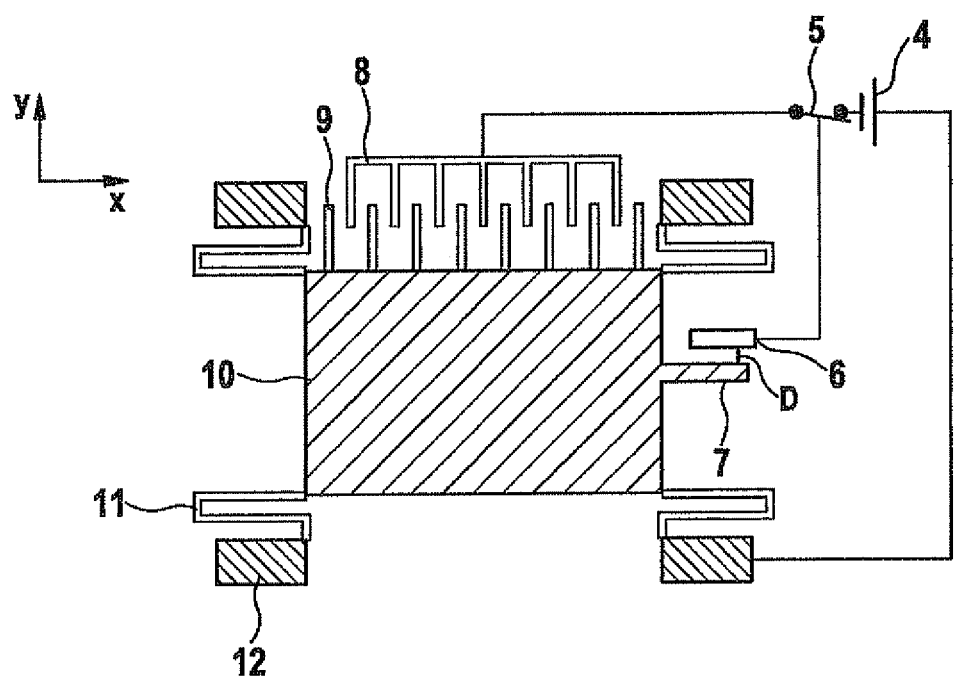

DEVICE FOR RESONANTLY DRIVING A MICROMECHANICAL SYSTEM

FIELD OF THE INVENTION

The present invention describes a device for resonantly driving a micromechanical system.

BACKGROUND INFORMATION

In microsystems technology, components having dimensions in the micrometer range act together in systems (MEMS=microelectromechanical systems) for various applications. Such micromechanical systems usually have one or more sensors and actuators, as well as a control electronics system. Compared to conventional "macrosystems", micromechanical systems above all have the advantages in cost savings (low use of materials, parallel production) and in efficiency (low energy and performance demand enables autonomous systems). In addition, they offer a great functional spectrum, high functional densities, new functionality (integration of electrical and nonelectrical functions). For, because of the integration and miniaturization, new physical effects are able to be utilized, and the short information paths lead to short reaction times. Moreover, they mostly have higher reliability than conventional systems, above all because of the omission of plugs and cables.

The use of micromechanical systems is conceivable wherever sensors and actuators and an electronic system collaborate. One of the greatest application areas is inertial sensors, such as gyroscopes, acceleration and inclination sensors. They are used, among other things, in the automotive area for triggering air bags and for the detection of skidding and rollover. In particular, one or multi-axial micromechanical yaw-rate sensors are used for the most varied applications (in the automotive field, for example, for ESP, navigation and rollover sensing=ROSE; in the consumer field, for instance, for image stabilization, motion detection and navigation). A common form of implementing these sensors uses the Coriolis effect. A mass suspended from springs is set into vibrational motions in a first direction by a drive mechanism, whereby a Coriolis force acts upon the mass when a rotational rate in a second direction is present. This force acts perpendicular both to the drive direction and to the rotational rate present and has the effect of a motion or oscillation of the mass in this third direction.

An acceleration sensor is discussed in DE 195 23 895, which is particularly developed as a Coriolis yaw-rate sensor. In one specific embodiment, the Coriolis yaw-rate sensor is also designed for the detection of linear accelerations. For this purpose, a vibrating structure formed by seismic masses and suspended to move in torsional vibration is given an additional electronic position control, which detects and dampens linear accelerations acting on the vibrational structure. This electronic position control is formed by comb structures, situated on the vibrating masses, which are engaged with additional comb structures, so that, if a voltage is applied, capacitances between the two comb structures are measurable. In response to a deflection of the vibrational structure by a linear acceleration, the distance between the individual fingers of the comb structures changes, whereby a capacitance change sets in which is detected using the position control electronic system. By changes in the voltage applied to the comb structures, it is possible, by electrostatic action, to regulate the distance between the comb structures to a specified setpoint value. The amount of the voltage used for the distance regulation at the same time supplies information on the size of the linear acceleration acting upon the vibrational structure.

To activate yaw-rate sensors, a circuit usually generates periodic voltage curves (such as sine or rectangular pulse), which are then converted via a capacitive drive structure on the sensor into periodic drive forces, which set the structure (i.e. the seismic mass) in vibration. In order to operate the sensor at its mechanical resonant frequency, it is of advantage to select and/or regulate the excitation frequency of the drive force in a suitable manner. At the resonant frequency, no phase shift prevails between the speed of motion of the seismic mass brought about by the drive force and the drive force.

In order for the vibrational amplitude to be controllable, a yaw-rate sensor usually also has elements for detecting the drive motion as well as corresponding control loops in the evaluation circuit. In currently available sensors, this drive circuit takes up relatively great space, however, namely ca. 30 to 40% of the active circuit area.

SUMMARY OF THE INVENTION

The exemplary embodiments and/or exemplary methods of the present invention provide a device for the resonant driving of a micromechanical system, which includes at least one seismic mass supported by spring vibrations, at least one drive for driving the vibration of the seismic mass and at least one element motionally coupled to the seismic mass. Furthermore, the device includes at least one detection element for detecting a relational parameter that changes with the vibration of the seismic mass, between the motionally coupled element and the detection element, the detection element being equipped to cause an interruption of the vibration drive in response to the reaching of a predetermined value of the relational parameter. The circumstance that the device, according to the exemplary embodiments and/or exemplary methods of the present invention, is suitable for resonantly driving a micromechanical system, does not mean that the exemplary embodiments and/or exemplary methods of the present invention are limited to a resonant drive. The relational parameter, as well as its predetermined value, at which the interruption of the vibration drive takes place, may perfectly well also be selected so that the seismic mass does not vibrate at its resonant frequency.

The device according to the present invention makes it possible, in an advantageous manner, to reduce the drive circuit to a minimum, without doing without a regulated amplitude and resonant frequency. In this instance, the drive concept provided almost completely does without active circuit structures, and therefore requires clearly less area than customary drives. The actual drive detection for the control and regulation of the drive amplitude, is also able to be implemented more efficiently as to area, with respect to a MEMS.

Further advantageous developments of the exemplary embodiments and/or exemplary methods of the present invention are yielded from the remaining features described herein.

The exemplary embodiments and/or exemplary methods of the present invention are explained in greater detail below on the basis of exemplary embodiments with reference to the drawings.

BRIEF DESCRIPTION OF THE DRAWINGS

The FIGURE shows, in exemplary fashion, the device according to the present invention, for resonantly driving a micromechanical system.

DETAILED DESCRIPTION

The device includes at least one seismic mass supported by spring vibrations. This is implemented in the FIGURE by a mass element 10, which is fastened via spring elements 11 vibrationally supported on substrate anchorings 12 (or on additional movable structures).

Furthermore, the device according to the exemplary embodiments and/or exemplary methods of the present invention includes at least one drive for driving the vibration of seismic mass 10. This is implemented, in exemplary fashion, in the FIGURE by a drive 8, 9; 4, which, at least on one side of seismic mass 10, has a capacitive comb drive 8, 9 for driving the vibration of seismic mass 10. Comb drive 8, 9 is able to have applied to it a sufficient voltage 4 for a deflection (in the y direction) of seismic mass 10. Capacitive comb drive 8, 9 has first comb electrodes 9, situated on seismic mass 10, which engage in a contact-free manner with second comb electrodes 8, that are mechanically decoupled from the vibrations of seismic mass 10.

The device according to the exemplary embodiments and/or exemplary methods of the present invention further includes at least one motional element 7 that is motionally coupled to seismic mass 10. This motional element 7 is implemented in the FIGURE by an extension which laterally goes forth from seismic mass 10. The motional element may be made of the same material as seismic mass 10 and may be produced as one piece with mass 10, or it may be connected to mass 10 in a materially integral fashion. However, it is also possible for motionally coupled element 7 to be made of a different material than that of seismic mass 10. The material of motionally coupled element 7 can then be advantageously matched for the cooperation to the detection element described below. In particular, the material of element 7 may be electrically conductive, and can be made of a metal, for example.

Furthermore, the device according to the exemplary embodiments and/or exemplary methods of the present invention includes at least one detection element 6 for detecting a relational parameter that changes with the vibration of the seismic mass 10, between motionally coupled element 7 and detection element 6. Detection element 6 is equipped to cause an interruption 5 of vibration drive 4 in response to the reaching of a predetermined value of the relational parameter. Any other parameters come into consideration as relational parameters, besides the distance between motionally coupled element 7 and detection element 6, such as a relative state of motion (speed, acceleration) or an electromagnetic interaction between the two elements, as long as they experience a change that is able to be correlated with the vibration of seismic mass 10. One may consider, in this context, that detection element 6 is mechanically decoupled from the vibrations of seismic mass 10 and motionally coupled element 7, so that the position of detection element 6 represents an absolute reference point for the vibrational motion of seismic mass 10 and of motionally coupled element 7. In the FIGURE, the relational parameter detected by detection element 6 is the distance D between motionally coupled element 7 and detection element 6. Detection element 6 is equipped to cause an interruption of voltage supply 4 of capacitive comb drive 8, 9 when a predetermined distance value between motionally coupled element 7 and detection element 6 is reached. To do this, detection element 6 acts on a switch 5 which interrupts the electrical connection between voltage supply 4 and capacitive comb drive 8, 9, when the predetermined interruption condition is present. Because of that, the deflecting force on seismic mass 10 is omitted, so that mass 10, because of the restoring spring force of spring 11, returns to its at-rest position (and from there is able to swing over in the opposite deflection direction −y).

Compared to the usual drive devices, in the device according to the exemplary embodiments and/or exemplary methods of the present invention, the timing of the drive is thus achieved by the sensor element itself (or rather by the motion of seismic mass 10 itself). Because of that, one may do without active circuit structures for driving the vibration of seismic mass 10, whereby, in turn, clearly less active circuit area is required. Moreover, for the functioning of the drive device according to the exemplary embodiments and/or exemplary methods of the present invention, it is sufficient to make available only a direct voltage. Thus, voltage supply 4 may be a direct voltage source. In a particularly advantageous manner, the drive principle according to the present invention may be combined with the evaluation method for the yaw-rate detection, which operate in the baseband and do without generating multiples of the drive frequency for evaluation purposes.

In the FIGURE, motionally coupled element 7 is mounted on seismic mass 10 in such a way that, when there is a sufficient deflection of mass 10 (and with that, of motionally coupled element 7) in the positive y direction, from the at-rest position, motionally coupled element 7 gets to the vicinity of detection element 6 (the distance between motionally coupled element 7 and detection element 6 thus falling below a predetermined value), whereby switch 5 is opened and, with that, the voltage supply between electrodes 8 and 9 is switched off. It is, however, equally possible to operate the system on the basis of the growing distance between motionally coupled element 7 and detection element 6. For this purpose, for instance, motionally coupled element 7 could be situated on the other side of detection element 6 (in the FIGURE that would mean above detection element 6). Then motionally coupled element 7 would be located, in the at-rest position of seismic mass 10, first of all, close to detection element 6. With increasing deflection of seismic mass 10 in the positive y direction, (that is, upwards in the FIGURE) the distance between motionally coupled element 7 and detection element 6 is then growing. If the distance then exceeds a predetermined value, switch 5 is opened, and, with that, the voltage supply between electrodes 8 and 9 is switched off.

Various physical effects, and designs and devices adjusted to them, of elements 6 and 7, may be utilized for the detection of the deflection of seismic mass 10, using motionally coupled element 7 and detection element 6 for the purpose of interrupting drive voltage 4.

For one thing, it is possible, for instance, to use the moving gate principle: In this instance, detection element 6 is executed as a field effect transistor (FET), the electric field for switching the FET being modified in that element 7, which is at a suitable electrical potential, at which the deflection of seismic mass 10 is guided by the channel area of the FET. In other words, the electric field for switching the FET, and the interruption, connected with that, of the vibration drive, is able to be influenced in that motionally coupled element 7 is guided via the channel area of the FET by the vibration of seismic mass 10.

Another possibility is to use the tunnel effect: Element 7 is provided with a tunnel tip in the horizontal or the vertical direction. A counterpart to this tunnel tip is mounted in solid detection element 6 in such a way that, at the desired deflection, the two tips approach each other so closely that a sufficient tunnel current is able to flow, which has the effect of switching switch 5. To put it differently, detection element 6 and motionally coupled element 7 each have a tunnel tip, which form a tunnel bridge for electric current, via which, at a predetermined approach of the two tunnel tips, a predetermined tunnel current flows, which has the effect of switching interruption switch 5, which may be for interrupting the vibration drive.

One further possibility is that detection element 6 and motionally coupled element 7 form an electrical capacitance that is changeable by the changeable distance D between them. The reaching of a predetermined threshold value of the capacitance effects the switching of interrupting switch 5, which may be for the interruption of the vibration drive. In contrast to the usual drive detection, in this instance a qualitative detection of the threshold value advantageously is sufficient. It is true, though, that the capacitive detection has a slightly higher switch cost, compared to the two other methods.

In order to implement various drive amplitudes, and to facilitate the process of starting the vibration, instead of having only one detection element 6 switching off, several of these may be used which are activated by appropriate interconnection configurations, for instance, during the adjustment of the sensors.

Instead of the one-sided drive, as shown in the FIGURE, a drive on both sides of the structure is also conceivable, the switching off of the drive combs then also having to take place on each side. Thus, a second comb drive may be provided, analogously to first comb drive 8, 9, on the opposite side of seismic mass 10, the drive and the drive interruption of the second comb drive being phase-shifted by 180° from the drive and the drive interruption of the first comb drive.

In the case in which a mere interruption of the voltage supply is not sufficient and does not lead fast enough to an electromagnetic decoupling of comb electrode 8 from comb electrode 9, a discharge of the electrodes may be undertaken. Therefore, the device according to the exemplary embodiments and/or exemplary methods of the present invention may include a discharge device for discharging first comb electrode 9 and/or second comb electrode 8 at, or directly after, the interruption of the voltage supply of the capacitive comb drive 8, 9.

Besides the capacitive drive selected in an exemplary fashion in the FIGURE, it is also possible, for instance, to implement the drive for driving the vibration of seismic mass 10 in piezoelectric, magnetic or thermoelastic functioning.

In the micromechanical system, of the exemplary embodiments and/or exemplary methods of the present invention, what may be involved, for example, is a one or multi-axial micromechanical system yaw-rate sensor, a micro-mirror or a micro-mirror array, or a resonator. In addition to linearly driven resonant systems, rotational vibrators may also be driven. In addition to a drive in the substrate plane (=drawing plane), vibrational motions perpendicular to the substrate plane are also possible.

As was described above in detail, the exemplary embodiments and/or exemplary methods of the present invention are highly suitable for saving circuit area, especially in yaw-rate sensors.

The reference symbols and references to figures in the following claims serve exclusively for easier orientation in the Application documents and are by no means to be understood in a way that restricts the subject matter of the claim to a specific embodiment shown in the FIGURE or explained in the description.

What is claimed is:

1. A device for resonantly driving a micromechanical system, comprising:
    at least one seismic mass supported by at least one spring;
    at least one drive for driving a vibration of the seismic mass;
    at least one element that is motionally coupled to the seismic mass;
    at least one detection element for detecting a relational parameter, between the motionally coupled element and the detection element, that is changeable with the vibration of the seismic mass;
    wherein the detection element is equipped to cause an interruption of the vibration drive when a predetermined value of the relational parameter is reached;
    wherein the detection element and the motionally coupled element each have a tunnel tip, which form a tunnel bridge for electric current, via which, at a predetermined approach of the two tunnel tips, a predetermined tunnel current flows, which has the effect of switching an interruption switch, interrupting the vibration drive.

2. The device of claim 1, wherein the drive has no mechanical contact with the seismic mass and with the motionally coupled element.

3. The device of claim 1, wherein the drive, at least on one side of the seismic mass, has a capacitive comb drive, for driving the vibration of the seismic mass, which is able to be acted upon by a voltage that is sufficient for a deflection of the seismic mass.

4. The device of claim 3, wherein the relational parameter detected by the detection element is the distance between the motionally coupled element and the detection element, and wherein the detection element is configured to cause an interruption of the voltage supply of the capacitive comb drive upon reaching a predetermined distance value between the motionally coupled element and the detection element.

5. The device of claim 3, wherein the capacitive comb drive has first comb electrodes and second comb electrodes, wherein the first comb electrodes are situated on the seismic mass, which engage in a contact-free manner with the second comb electrodes, that are mechanically decoupled from the vibrations of the seismic mass.

6. The device of claim 3, wherein the voltage supply is a DC voltage source.

7. The device of claim 1, wherein the drive for driving the vibration of the seismic mass is implemented in one of a piezoelectric, magnetic or thermoelastic mode of operation.

8. The device of claim 1, further comprising:
    a plurality of detection elements for various drive amplitudes of the vibration of the seismic mass.

9. The device of claim 1, wherein the detection element is mechanically decoupled from the vibrations of seismic mass and the motionally coupled element, so that the position of the detection element represents an absolute reference point for the vibrational motion of seismic mass and of the motionally coupled element.

10. The device of claim 1, wherein the micromechanical system includes at least one of a one-axial micromechanical yaw-rate sensor, a multi-axial micromechanical yaw-rate sensor, a micro-mirror array, or a resonator.

* * * * *